May 28, 1963 D. F. COLE 3,091,171
BROILER
Filed Sept. 15, 1960 2 Sheets-Sheet 1

INVENTOR.
DAVID F. COLE
BY
Oberlin, Maky & Donnelly
ATTORNEYS

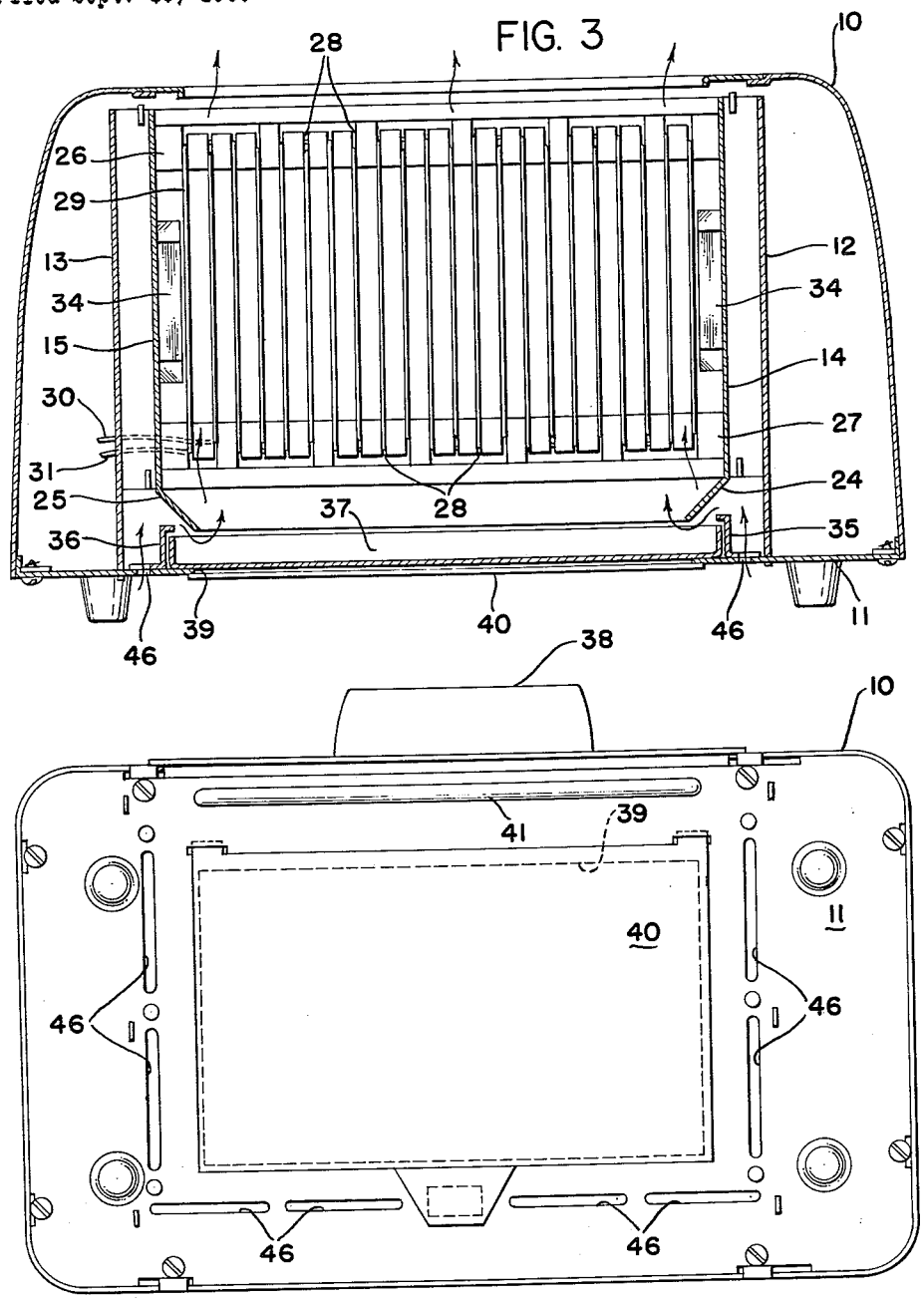

United States Patent Office 3,091,171
Patented May 28, 1963

3,091,171
BROILER
David F. Cole, 513 Beechwood Drive, Mansfield, Ohio
Filed Sept. 15, 1960, Ser. No. 56,161
2 Claims. (Cl. 99—400)

This invention relates to further improvements in the broiler shown in my Patent No. 2,913,976 and also in my co-pending application Serial No. 828,093, filed on July 20, 1959.

The basic broiler structure of such prior disclosures comprises a portable housing and a vertical heating chamber therewithin to which access is had through a slot provided in the top of the housing. Electric heating elements are disposed generally vertically in the housing respectively at the sides of the heating compartment, and a separate holder in the form of a grid and the like insertible in the housing slot is utilized to support meat to be broiled vertically in the compartment or chamber between the heating elements, whereby both sides of the thus positioned meat product are simultaneously cooked. A timing mechanism, preferably pneumatic in accordance with my noted prior disclosures, is provided for automatic timed control of the energization of the electric heating elements.

Although the meat is thus suspended while being cooked, with juices and hot grease draining freely therefrom, particles of grease are also thrown laterally to either side of the meat and consequently against the electric heating elements. The latter are preferably convoluted lengths of high resistance wire which become incandescent, and globules of grease coming into contact with the same are explosively or quickly burned. Such flashing of grease spatter on the heating elements produces objectionable smoking, and it is a primary object of the present invention to provide the broiler with means for eliminating such smoking of grease.

It is a further object of the invention to provide an electric broiler of the indicated type in which ambient air is circulated through the unit by convection currents in operation thereof and over the electric heating elements, such movement of air having been found effective to eliminate the smoking which would otherwise incur as the result of impingement of grease particles on the heating elements.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said drawings:

FIG. 3 is a longitudinal section of the broiler; and

FIG. 4 is a bottom plan view of such broiler.

Figure 1:
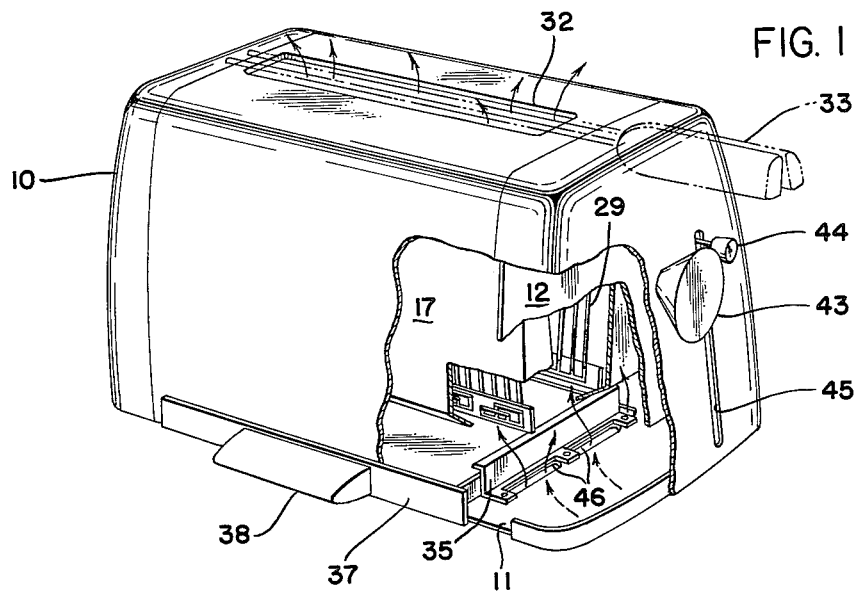
FIG. 1 is a perspective view of an electric broiler in accordance with the present invention, with parts broken away.

Referring now to the drawings in detail, the illustrated broiler comprises an enclosure or housing 10 having top and side walls and being generally rectangular in shape. A bottom plate 11 is secured to the lower edges of the housing side walls and thus forms a substantially completely closed outer shell with the housing.

Figure 2:
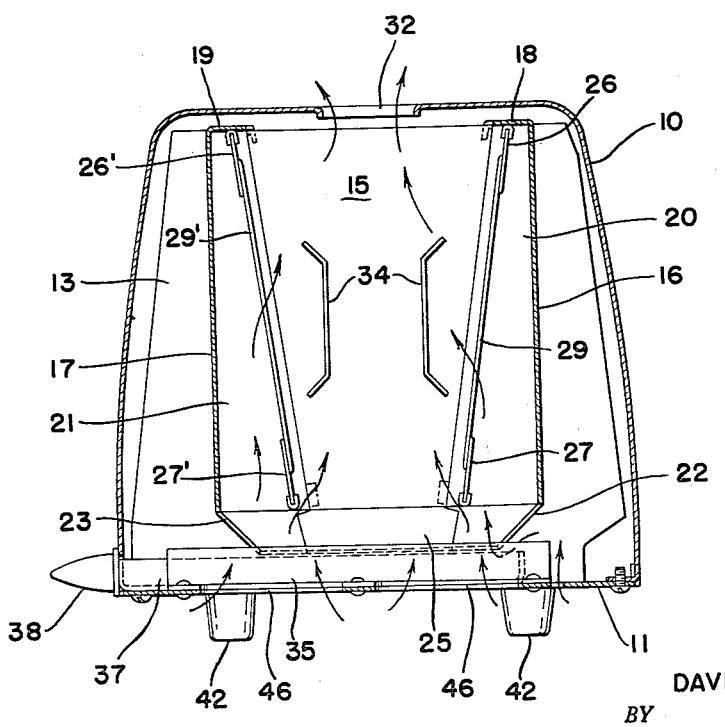
FIG. 2 is a transverse sectional view of this broiler on slightly enlarged scale.

The interior of the housing is compartmented longitudinally by two transverse partitions 12 and 13 which define end compartments with the respectively opposed side walls of the housing and a considerably larger heating or cooking compartment between the partitions. An electric heating assembly is suspended in this last compartment and comprises imperforate end baffles 14 and 15 and side plates 16 and 17 which together form an inner enclosure extending vertically and being open at the top and bottom. With particular reference to FIG. 2, such side plates have inturned right angle flanges 18, 19 at their top edges, tapered flanges 20, 21 of downwardly increasing lateral extent at their vertical edges, and inclined bottom portions 22, 23, the latter being directed inwardly. The end baffles 14 and 15 are shaped to bridge between the opposed vertical flanged edges of the side plates at the particular end of the assembly and also have inclined bottom edge portions 24, 25. The inner shell thus has, as illustrated, substantially vertical walls and inwardly converging bottom edge portions the purpose of which will be described later.

The side plate 16 supports a pair of longitudinally extending bars made of suitable thermal and electrical insulation material, with the bar 26 adjacent the top of the plate and the second bar 27 being spaced relatively outward from the first and approximately at the elevation of the beginning of the inclined bottom margin 22. The bars can be thus supported in any suitable manner, for example, by having their ends received in slots provided in the end flanges 20 and 21 of the side plate 16. Again as best shown in FIG. 2, the two such bars are in a single inclined plane, spaced inwardly from the body of the side plate 16, and the bars are provided with longitudinally spaced notches 28 in their respective outer edges in the manner shown in FIG. 3. An electric resistance wire or strip 29 is wound between the bars 26 and 27 and about the notched portions thereof, with the illustrated formation providing an insulated overlap of the turns, as illustrated in FIG. 1, which permits both ends 30 and 31 of the element to be located at the same lower corner of the assembly for convenient connection. A second assembly of insulative bars and heating element, designated by primed reference numerals, is correspondingly supported by the other side plate 17, so that there are downwardly converging exposed heating elements in spaced opposition within the inner shell of the heating compartment. It will be understood that these elements will be connected for energization by an available source of electric energy, and that they will become incandescent when thus energized for radiant heating.

The top of the housing or outer shell 10 is provided with a slot 32 roughly coextensive with the projected area of the heating elements, the slot being on the longitudinal center line and access of course thereby being provided to the inner heating compartment. The dashed outline 33 in FIG. 1 represents a separate meat holder in the form of a hinged grid which is employed to hold the meat to be broiled, and it will be clear that insertion of the holder in the top slot of the unit as indicated suspends the meat therewithin verticallly between the two heating elements. In order properly to locate the body of a thus inserted holder, the end baffles 14, 15 of the inner shell are each provided with a pair of opposed vertical guides 34 to center the holder body therebetween.

The bottom plate 11 of the outer shell supports a pair of inner guides 35 and 36 extending transversely in spaced relation, and these guides receive a drip tray 37 cooperably with the base. Such tray resembles a drawer having a handle 38 and being accommodated removably in the assembly through an opening provided therefor in one of the side walls of the housing 10. The tray is of such size as to be beneath the bottom periphery of the inner shell, with the sides of the drawer outwardly of the edges defining such periphery, and the tray is fully withdrawable from the unit for separate handling.

A rectangular opening 39 of substantial size is provided centrally in the bottom plate 11 and normally closed by a removable cover 40, with some appropriate form of latch provided releasably to retain the cover in its such closure condition. A stiffening bead 41 is formed along the edge portion of the bottom plate where the drip tray emerges, and four small pedestals 42 (FIG. 2) are secured externally to the bottom 11 to elevate the same and hence the broiler proper above a support surface on which it may be placed. The end handle 43 shown in FIG. 1 is a carrying handle, and a mate is provided on the other end wall of the housing. This figure also shows a lever 44 movable in a vertical slot 45 in the near end wall, and the same is used to control a timing mechanism ordinarily housed in the adjacent end compartment but not shown here. Reference may be had, if desired, to my patent noted earlier for a disclosure of such a timing mechanism, the function of which is of course to adjustably determine the periods of energization of the electric heating elements and hence the cooking operation.

It will be seen that meat held as earlier described between the electric heating elements 29 and 29' will be simultaneously cooked on both sides, and the essence of the meat and hot grease will drain freely to the lower drip tray 37 for collection. The inturned bottom edges of the inner shell members 14–17 enclosing the heating elements in spaced relation serve to facilitate such collection, with the enclosing shell of course containing spatter. When a particular broiling operation has been completed, the drip tray can be withdrawn from the unit for separate cleaning, and access to the interior for purposes of cleaning or maintenance can be had by removal of the bottom cover 40.

As best shown in FIG. 4, the bottom plate 11 is also provided with a series of ports 46 shaped as elongated slots and disposed about the three inner sides of the drip tray and guide assembly. Such ports permit inflow of ambient air to the heating compartment in operation of the broiler, with convection currents being produced as indicated by the arrows in the remaining figures. It will thus be seen that ambient air is circulated upwardly through the heating compartment and over the exposed heating elements 29 and 29' from the bottom ports 46 to the top slot 32 in the housing 10, and it has been demonstrated that such circulation eliminates smoking of grease which would otherwise occur. The resistance wires when energized become incandescent, as stated previously and it is believed that the high surface temperature of the elements which results without venting as described is such that particles of grease inevitably impinging on the elements flash or explode, with the smoke being produced by this action. It is also believed that the circulation of air disclosed has the effect of lowering the element surface temperature to the point where the grease particles contacting the elements are more slowly and completely burned. Such venting has in any case eliminated the smoking, while other expedients, such as reducing the wattage of the elements, have failed.

The total inlet area provided by the several bottom ports is related to the size or capacity of the broiler in that such area is determined by its effectiveness in thus eliminating the smoking. That is, the performance of a prototype in actual operation is observed with the total inlet area being gradually increased in appropriate manner until smoking ceases and the necessary area is thereby determined for the particular broiler. The preferred heater structure, comprising convolutions which are substantially free in the sense of being exposed at all sides facilitates contact of the moving air therewith, and the internal structure otherwise accommodates flow of the air from the bottom ports through the region of the heating elements.

Other modes of applying the principle of the invention may be employed, change being made as regards the details described, provided the features stated in any of the following claims or the equivalent of such be employed.

I, therefore, particularly point out and distinctly claim as my invention:

1. An electric broiler comprising an outer substantially completely closed shell having feet which space the bottom thereof above a support surface, interior walls defining an inner shell open at the top and bottom within said outer shell, a pair of electric radiant heating elements supported within and respectively adjacent opposed side of the inner shell, the top of the outer shell being provided with a slot for insertion of a meat holder between said heating elements, a removable drip tray beneath the inner shell to collect and contain fluids draining from meat being broiled therein, and a series of ports provided in the bottom of the outer shell about the drip tray for admittance of ambient air, convection currents being produced in operation of the broiler proceeding from said ports upwardly through the inner shell and over the heating elements to the top slot of the outer shell, with such upward circulation of air being effective to eliminate smoking of grease particles contacting the heating elements which would occur in a broiling operation without such flow of air.

2. An electric broiler as set forth in claim 1 wherein said electric heating elements are exposed on all sides over the major portions of the same.

References Cited in the file of this patent
UNITED STATES PATENTS

| | | |
|---|---|---|
| 1,876,901 | Forbes | Sept. 13, 1932 |
| 2,151,105 | Hendershot et al. | Mar. 21, 1939 |
| 2,545,404 | Young | Mar. 13, 1951 |
| 2,913,976 | Cole | Nov. 24, 1959 |
| 2,951,432 | Lawser | Sept. 6, 1960 |